(12) United States Patent
Kinjo

(10) Patent No.: US 11,202,980 B2
(45) Date of Patent: Dec. 21, 2021

(54) FILTER CONTAINER ATTACHMENT AND DETACHMENT SYSTEM

(71) Applicant: ROKI TECHNO CO., LTD., Tokyo (JP)

(72) Inventor: Takashi Kinjo, Tokyo (JP)

(73) Assignee: Roki Techno Co., Ltd., Tokyo (JP)

(*) Notice: Subject to any disclaimer, the term of this patent is extended or adjusted under 35 U.S.C. 154(b) by 0 days.

(21) Appl. No.: 16/479,213

(22) PCT Filed: Jan. 19, 2017

(86) PCT No.: PCT/JP2017/001800
§ 371 (c)(1),
(2) Date: Jul. 18, 2019

(87) PCT Pub. No.: WO2018/134954
PCT Pub. Date: Jul. 26, 2018

(65) Prior Publication Data
US 2019/0374887 A1 Dec. 12, 2019

(51) Int. Cl.
*B01D 35/30* (2006.01)
*B01D 29/11* (2006.01)

(52) U.S. Cl.
CPC ............ *B01D 35/306* (2013.01); *B01D 29/11* (2013.01); *B01D 2201/4023* (2013.01)

(58) Field of Classification Search
CPC ...... B01D 27/08; B01D 29/11; B01D 35/306; B01D 2201/4023
See application file for complete search history.

(56) References Cited

U.S. PATENT DOCUMENTS

| | | | |
|---|---|---|---|
| 5,397,462 A | 3/1995 | Higashijima et al. | |
| 6,120,685 A | 9/2000 | Carlson et al. | |
| 2013/0228509 A1* | 9/2013 | Kuruc | B01D 35/30 210/435 |

FOREIGN PATENT DOCUMENTS

| | | |
|---|---|---|
| CN | 105521652 A | 4/2016 |
| JP | 2007-253154 A | 10/2007 |

(Continued)

OTHER PUBLICATIONS

International Preliminary Report on Patentability and Written Opinion issued in PCT/JP2017/001800, dated Jul. 23, 2019.

*Primary Examiner* — Patrick Orme
(74) *Attorney, Agent, or Firm* — BakerHostetler

(57) ABSTRACT

A filter attachment and detachment apparatus removably attaching a filter container containing a filter, as a part of a filtration apparatus that filters fluid with the filter, includes a first mounting protrusion at one end of the filter container to protrude from the filter container, the first mounting protrusion including a flow path in fluid communication with the filter inside the filter container, a rotation element to which a first flow path for the fluid is connected, the rotation element including an opening groove configured to receive the first mounting protrusion, and a first mounting protrusion holding part configured to rotatably hold the rotation element. The first mounting protrusion holding part includes an inner periphery surface and a notch communicating with an outer side of the inner periphery surface, where in a state where the first mounting protrusion is inserted into the opening groove through the notch, by rotating the rotation element, the first mounting protrusion is bound between the inner periphery surface of the first mounting protrusion holding part and the rotation element.

4 Claims, 6 Drawing Sheets

(56) References Cited

FOREIGN PATENT DOCUMENTS

| WO | 2016/185504 A1 | 11/2016 |
| WO | 2016/185506 A1 | 11/2016 |

\* cited by examiner

FILTER CONTAINER ATTACHMENT AND DETACHMENT SYSTEM

CROSS-REFERENCE TO RELATED APPLICATIONS

This application is a National Stage of International Patent App No. PCT/JP2017/001800, filed Jan. 19, 2017, the disclosure of which is incorporated by reference in its entirety.

TECHNICAL FIELD

The present invention relates to, for example, an attachment and detachment system for a filter container incorporating a filter, etc., thereinside.

BACKGROUND ART

In a flow path of an apparatus aimed at filtration of fluid, a filter container that incorporates a filter, etc., and that is removably arranged may be used in a part of the flow path. For example, when a predetermined amount of filtration ends, an old filter container is removed, and is replaced with a new filter container. In such a flow path, a manifold that lacks a part of the flow path is provided between an end of an upstream side flow path and an end of a downstream side flow path. The filter container includes a structure that can be removably attached between the end of this upstream side flow path and the end of the downstream side flow path. A flow channel is formed inside the filter container, and both ends of the flow channel include a flow channel inlet and a flow channel outlet. A filter, etc., is arranged in the flow channel. Generally, the end of the upstream side flow path and the end of the downstream side flow path are configured as a part of the manifold, and when the filter container is attached to the manifold, the flow channel inlet of the filter container into which fluid flows joins to the end of the upstream side flow path, and the flow channel outlet from which the fluid is discharged joins to the end of the downstream side flow path. Accordingly, the flow channel in the filter container is connected to the flow path that lacks a part of the flow channel, and the flow path of a flow circuit system is completed. For example, PTL 1 to PTL 3 describe examples that attach a removable filter container to a manifold as a holder.

Each of PTL 1 to PTL 3 discloses an example that forms, as a part of an existing flow path, a flow path with a filter container that can be replaced by detaching and attaching. In PTL 1 to PTL 3, the distance between one end and the other end of a flow path on a manifold side is constant. In each of the Patent Literatures, the filter container includes, at one end of the filter container, a flow channel inlet from which fluid to be filtered flows into the filter container, and a flow channel outlet is arranged at the other end of the filter container on an opposite side of the flow channel inlet. Additionally, the direction in which the flow channel inlet extends, and the direction in which the flow channel outlet extends are the same directions.

PTL 1 and PTL 2 are examples in which a filter container is attached to a manifold by pivot movement. In the example of PTL 1, the filter container has a structure that can be contracted and extended, and in a state where the filter container is contracted, a lower flow path end of the filter container is inserted into a pivot of a manifold, an upper side of the filter container is moved into the manifold by a pivot operation in the state where the filter container is contracted, the filter container is extended, and the flow path of the filter container is connected to the flow path of the manifold so as to be inserted into the flow path of the manifold. However, when the functions of contraction/extension are provided to the filter container, the structure of the filter container becomes complicated, and the problems of the cost for manufacturing the filter container and the deterioration of durability occur.

On the other hand, in the example of PTL 2, the filter container does not have the functions of contraction/extension, a lower flow path end of the filter container is made into a spherical body, and an upper side of the filter container is moved into the manifold by pivot operation while making the spherical body serve as a pivot, such that the flow path of the filter container is inserted in the flow path of the manifold. However, in such attachment of the filter container by the pivot operation, since the range of movement of the opposite side end of the pivot is wide, the rubbing distance of a sealing member is long, and abrasion of the sealing member becomes large, which lead to the problem of dust generation.

Meanwhile, in PTL 3, an example of configuring a filter container such that the filter container can be attached and detached without using a pivot operation is disclosed. In PTL 3, the filter container is installed between an end of an upstream side flow path and an end of a downstream side flow path of a manifold by a translation operation from a direction perpendicular to a virtual straight line connecting these flow paths, such that the direction of the flow channel inlet and the flow channel outlet of the filter container is aligned with the direction of the virtual straight line.

CITATION LIST

Patent Literature

PTL 1: U.S. Pat. No. 5,397,462
PTL 2: Japanese Patent Application Laid-Open No. 2007-253154
PTL 3: U.S. Publication No. 2013/0228509

SUMMARY OF INVENTION

Technical Problem

In an apparatus aimed at filtration of fluid, in order to make it possible to removably attach a filter container to a manifold, it is necessary for the joining portion of the fluid inlet/outlet of the filter container and the fluid inlet/outlet of the manifold to have a high degree of sealing, so as to prevent leakage of the fluid. However, as disclosed in PTL 3, in the attachment and detachment apparatus with which the distance between one end and the other end of a flow path on a manifold side is constant, and a filter container is attached by a translation operation, when a high degree of adhesion is secured for the joining portion of the fluid inlet/outlet of the filter container and the fluid inlet/outlet of the manifold, friction at the joining portion of the fluid inlet/outlet of the filter container and the fluid inlet/outlet of the manifold becomes large, and attachment and detachment work becomes difficult. Further, since the friction at the time of attachment and detachment is large, the abrasion of the sealant in the joining portion is severe, and there is a problem that the durability as the filter container is degraded, because of a deterioration in the fluid quality due to dust produced from the sealant by the abrasion, or a deterioration in the degree of the adhesion in connection with deformation of the sealant. Therefore, in the attachment and detachment apparatus with which the distance between one end and the other end of the flow path on the manifold side is constant, and the filter container is attached by a translation operation, it is required to perform easy attachment and detachment while securing a high degree of adhesion. Especially, when the filter container is detached, it is desired that attachment is performed by a simplified method.

Solution to Problem

A solution is made by a filter attachment and detachment apparatus for removably attaching a filter container in which a filter is contained therein, as a part of a filtration apparatus that filters fluid with the filter, the attachment and detachment apparatus including, a first mounting protrusion provided at one end of the filter container to protrude from the filter container, the first mounting protrusion including a flow path communicating with the filter inside the filter container, a rotation element to which a first flow path for the fluid is connected, the rotation element including an opening groove capable of receiving the first mounting protrusion; and a first mounting protrusion holding part configured to rotatably hold the rotation element, the first mounting protrusion holding part including an inner periphery surface and a notch communicating with an outer side of the inner periphery surface, wherein in a state where the first mounting protrusion is inserted into the opening groove through the notch, by rotating the rotation element, the first mounting protrusion is bound between the inner periphery surface of the first mounting protrusion holding part and the rotation element.

Advantageous Effects of Invention

According to the present invention, the attachment and detachment of a filter container become easy.

DESCRIPTION OF EMBODIMENTS

Embodiment 1

Figure 1:
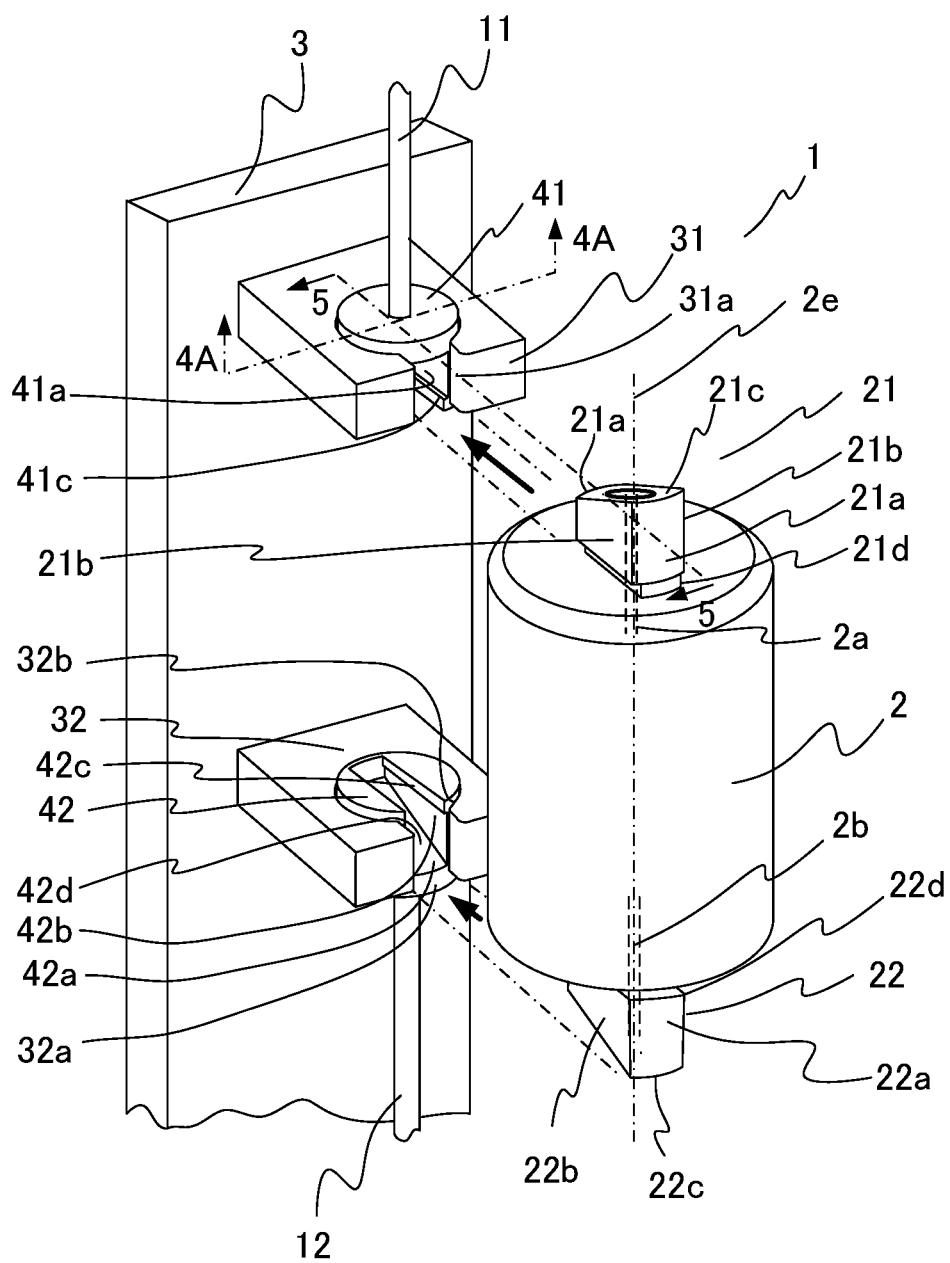
FIG. 1 shows an attachment and detachment apparatus of Embodiment 1 to which the present invention is applied, in a state before a filter container is installed to a manifold.
Figure 5:
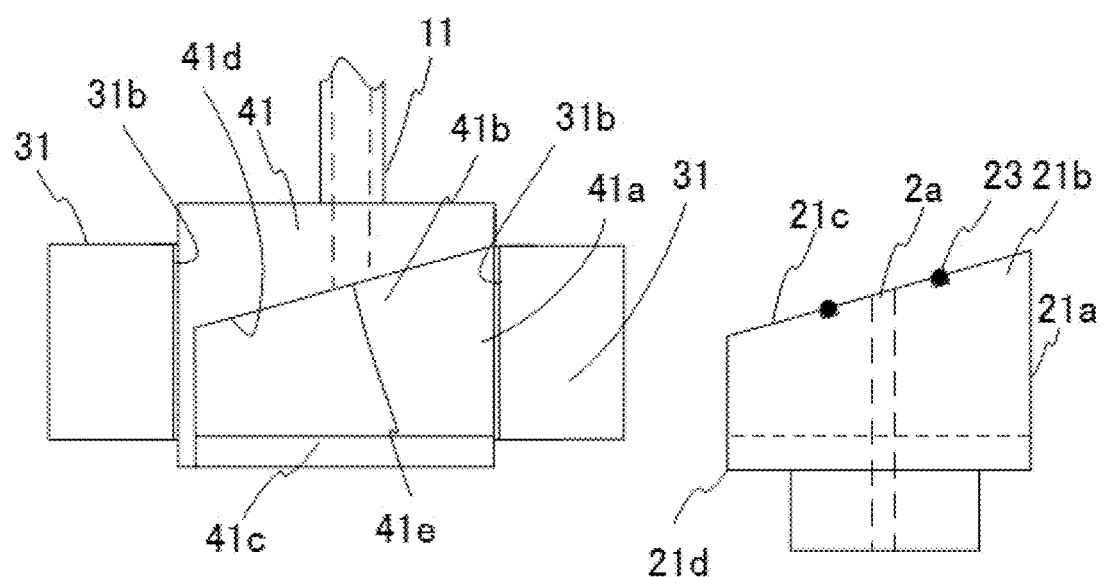
FIG. 5 is a diagram showing the cross-section 5-5 of FIG. 1.

With reference to FIG. 1 and FIG. 5, Embodiment 1 of the present invention will be described. FIG. 1 shows a filter container attachment and detachment apparatus 1 in a filtration apparatus used for filtration of fluid with a filter in Embodiment 1 of the present invention. The filter container attachment and detachment apparatus 1 is an attachment and detachment apparatus that is attached to a manifold 3, and to/from which a filter container 2 incorporating a filter (not shown) is attached/detached. FIG. 1 shows a state where the filter container 2 is separated from the filter container attachment and detachment apparatus 1. FIG. 5 is a diagram showing a cross-section of a first mounting protrusion holding part 31 in the state where the filter container 2 is separated from the filter container attachment and detachment apparatus 1, and is a diagram corresponding to the cross-section 5-5 of FIG. 1.

Typically, the filter container 2 has a cylindrical shape, and is a capsule-shaped container incorporating the filter in an internal space. An internal flow path 2a and an internal flow path 2b are connected to the internal space. The filter container 2 includes a first mounting protrusion 21 that extends so as to protrude from the filter container 2. Additionally, the filter container 2 includes a second mounting protrusion 22 at an end opposite to a side at which the first mounting protrusion 21 is arranged. The internal flow path 2a and the internal flow path 2b are connected to the internal space (not shown) where the filter inside the filter container 2 is arranged. The first mounting protrusion 21 includes rotation sliding surfaces 21a and translation sliding surfaces 21b on side surfaces. The second mounting protrusion 22 includes rotation sliding surfaces 22a and translation sliding surfaces 22b on side surfaces. The first mounting protrusion 21 includes an end face 21c at an end, and the second mounting protrusion 22 includes an end face 22c at an end. The end face 21c and the end face 22c are inclined surfaces having slopes. The internal flow path 2a is disposed in the first mounting protrusion 21 from the internal space (not shown), reaches the end face 21c of the first mounting protrusion 21, and forms an opening. The internal flow path 2b is disposed in the second mounting protrusion 22 from the internal space, reaches the end face 22c of the second mounting protrusion 22, and forms an opening. Sealants 23, such as packings, with which fluid does not flow out of the openings are arranged around these openings.

The filter container 2 includes a rotation center axis 2e defined in a directions from the filter container 2 toward the first mounting protrusion 21 and the second mounting protrusion 22. The rotation center axis 2e is defined as the rotation center axis 2e of the first mounting protrusion 21, and as the rotation center axis 2e of the second mounting protrusion 22 that is concentric with the rotation center axis 2e of the first mounting protrusion 21. The rotation sliding surfaces 21a and the rotation sliding surfaces 22a are formed as curved surfaces. The curved surface shape is a shape in which a cross-section taken along a surface perpendicular to the rotation center axis 2e of the filter container 2 forms a part of an outer circumference of an imaginary circle about the rotation center axis 2e of the filter container 2. On the other hand, the translation sliding surface 21b and the translation sliding surface 22b are formed in a form of a pair of flat surfaces, i.e., one flat surface and the other flat surface located on an opposite side, respectively. The flat surface shape is a shape in which the cross-section taken along the surface perpendicular to the rotation center axis 2e of the filter container 2 corresponds to a chord of the imaginary circle about the rotation center axis 2e of the filter container 2. The translation sliding surface 21b and the translation sliding surface 22b can be formed to be parallel to each other. Additionally, the translation sliding surface 21b and the translation sliding surface 22b can also be formed to have an angle. The angles formed by the respective pairs of the flat surfaces constituting the translation sliding surfaces 21b and the translation sliding surfaces 22b do not need to be parallel between the translation sliding surfaces 21b and the translation sliding surfaces 22b, and may be different.

The filter container attachment and detachment apparatus 1 includes the first mounting protrusion holding part 31, and the second mounting protrusion holding part 32. The first mounting protrusion holding part 31 and the second mounting protrusion holding part 32 are attached to the manifold 3. The first mounting protrusion holding part 31 rotatably holds a rotation element 41. The second mounting protrusion holding part 32 rotatably holds a rotation element 42. Each of the rotation element 41 and the rotation element 42 has an axisymmetric shape. For example, the rotation element 41 and the rotation element 42 have the shape of a truncated cone or a cylinder. A axisymmetric-shaped rotation axis is the rotation center axis 2e of the filter container 2 in a state where the rotation element 41 holds the rotation sliding surfaces 21a of the filter container 2, and is the rotation center axis 2e of the filter container 2 in a state where the rotation element 42 holds the rotation sliding surfaces 22a of the filter container 2.

A first flow path 11 is connected to the rotation element 41. A second flow path 12 is connected to the rotation element 42. The first flow path 11 may be used as an upstream flow path, and the second flow path 12 may be used as a downstream flow path. Conversely, the second flow path 12 may be used as an upstream flow path, and the first flow path 11 may be used as a downstream flow path. A missing portion of a flow path exists between the first flow path 11 and the second flow path 12. When the filter container 2 is removably attached to this missing portion, the internal space of the filter container 2 is connected to the first flow path 11 and the second flow path 12 through the internal flow path 2a and the internal flow path 2b. The fluid to be filtered is led from the first flow path 11 to the second flow path 12 through the internal flow path 2a, the internal space of the filter container 2, and the internal flow path 2b.

The rotation element 41 held by the first mounting protrusion holding part 31 holds the first mounting protrusion 21 of the filter container 2 in a detachable manner. The rotation element 42 held by the second mounting protrusion holding part 32 holds the second mounting protrusion 22 of the filter container 2 in a detachable manner. The first mounting protrusion holding part 31 includes a cylindrical through-hole in a center portion. The first mounting protrusion holding part 31 further includes a notch 31a that communicates the through-hole with an outer side of the first mounting protrusion holding part 31. An inner periphery surface 31b of the through-hole has a curved surface shape. The shape of the inner periphery surface 31b of this through-hole corresponds to the shape of an outer periphery surface of the rotation element 41. With this shape, the outer periphery of the rotation element 41 is rotated along the inner periphery surface 31b of the through-hole, and at this moment, the rotation element 41 is rotated about the rotation center axis 2e of the filter container 2. That is, the curved surface shape of the inner periphery surface 31b of the through-hole has the axisymmetric shape about the rotation center axis 2e of the filter container 2. That is, the curved surface shape of the inner periphery surface 31b has a shape of an arc of a circle about the rotation center axis 2e of the filter container 2 in an arbitrary cross-section perpendicular to the rotation center axis 2e of the filter container 2 in a state where the filter container 2 is attached to the manifold 3.

Similarly, the second mounting protrusion holding part 32 includes a cylindrical through-hole in a center portion. The second mounting protrusion holding part 32 includes a notch 32a that communicates the through-hole with an outer side of the second mounting protrusion holding part 32. An inner periphery surface 32b of the through-hole has a curved surface shape. The shape of the inner periphery surface 32b of this through-hole corresponds to a shape of an outer periphery surface of the rotation element 42. With this shape, the outer periphery of the rotation element 42 is rotated along the inner periphery surface 32b of the through-hole, and at this moment, the rotation element 42 is rotated about the rotation center axis 2e of the filter container 2. That is, the curved surface shape of the inner periphery surface 32b of the through-hole has the axisymmetric shape about the rotation center axis 2e of the filter container 2. That is, the curved surface shape of the inner periphery surface 32b has a shape of an arc of a circle about the rotation center axis 2e of the filter container 2 in an arbitrary cross-section perpendicular to the rotation center axis 2e of the filter container 2 in the state where the filter container 2 is attached to the manifold 3.

A width of the notch 31a of the first mounting protrusion holding part 31 is larger than at least a surface-to-surface distance between one of the translation sliding surfaces 21b and the other of the translation sliding surfaces 21b in the first mounting protrusion 21. When the surface-to-surface distance between one of the translation sliding surfaces 21b and the other of the translation sliding surfaces 21b is not constant, the width of the notch 31a is made larger than the maximum surface-to-surface distance. Similarly, A width of the notch 32a of the second mounting protrusion holding part 32 is larger than at least a surface-to-surface distance between one of the translation sliding surfaces 22b and the other of the translation sliding surfaces 22b in the second mounting protrusion 21. When the surface-to-surface distance between one of the translation sliding surfaces 22b and the other of the translation sliding surfaces 22b is not constant, the width of the notch 32a is made larger than the maximum surface-to-surface distance.

The rotation element 41 includes, in the periphery of a side surface, an opening groove 41a that can receive the first mounting protrusion 21 of the filter container 2, and holds the first mounting protrusion 21 of the filter container 2 in a detachable manner. The opening groove 41a includes inner wall surfaces 41b thereinside. When the first mounting protrusion 21 of the filter container 2 is attached to the opening groove 41a, the first mounting protrusion 21 is inserted into the rotation element 41 while the translation sliding surfaces 21b of the first mounting protrusion 21 move along the inner wall surfaces 41b of the opening groove 41a. Additionally, further, the first mounting protrusion 21 includes an engagement part 21d that follows an insertion direction, when the first mounting protrusion 21 is inserted into the rotation element 41. Especially, the first mounting protrusion 21 may include the engagement part 21d that follows the insertion direction, when the first mounting protrusion 21 is inserted into the rotation element 41. In this case, a holding engagement part 41c, which is slidable when engaged with the engagement part 21d, is arranged at the inner wall surface 41b of the opening groove 41a. Further, it is also possible to adopt a structure in which the holding engagement part 41c can support and hold the engagement part 21d. In this manner, the first mounting protrusion 21 is inserted into the rotation element 41, while being held by the holding engagement part 41c of the opening groove 41a.

Similarly, the rotation element 42 includes, in the periphery of a side surface, an opening groove 42a that can receive the second mounting protrusion 22 of the filter container 2, and holds the second mounting protrusion 22 of the filter container 2 in a detachable manner. Similar to the opening groove 41a that receives the first mounting protrusion 21, the opening groove 42a includes inner wall surfaces 42b thereinside. When the second mounting protrusion 22 of the filter container 2 is attached to the opening groove 42a, the second mounting protrusion 22 is inserted into the rotation element 42 while the translation sliding surfaces 22b of the second mounting protrusion 22 move along the inner wall surfaces 42b of the opening groove 42a. Additionally, further, the second mounting protrusion 22 includes an engagement part 22d that follows an insertion direction, when the second mounting protrusion 22 is inserted into the rotation element 42. Especially, the second mounting protrusion 22 may include the engagement part 22d that follows the insertion direction, when the second mounting protrusion 22 is inserted into the rotation element 42. In this case, a holding engagement part 42c, which is slidable when engaged with the engagement part 22d, is arranged at the inner wall surface 42b of the opening groove 42a. Further, it is also possible to adopt a structure in which the holding engagement part 42c can support and hold the engagement part 22d. In this manner, the second mounting protrusion 22 is inserted into the rotation element 42, while being held by the holding engagement part 42c of the opening groove 42a.

A surface in which a flow path opening 41e of the first flow path 11 of the opening groove 41a of the rotation element 41 is located includes an inclined surface 41d that is inclined toward a direction in which the first mounting protrusion 21 of the filter container 2 is inserted into the opening groove 41a. Additionally, a surface in which a flow path opening 42e of the second flow path 12 of the opening groove 42a of the rotation element 42 is located includes an inclined surface 42d that is inclined toward a direction in which the second mounting protrusion 22 of the filter container 2 is inserted into the opening groove 42a. Typically, although the inclined surface 41d and the inclined surface 42d are flat surfaces having constant angles of inclination at arbitrary positions of the direction in which the first mounting protrusion 21 and the second mounting protrusion 22 of the filter container 2 are inserted into the opening groove 41a and the opening groove 42a, respectively, the inclined surface 41d and the inclined surface 42d may be curved surfaces having different angles of inclination at the arbitrary positions. That is, the shapes of the inclined surface 41d and the inclined surface 42d are the shapes in which the distance between the inclined surface 41d and the inclined surface 42d at arbitrary positions is shortened from an opening side toward a back side of the opening groove 41a and the opening groove 42a. In a state where the second mounting protrusion 22 of the filter container 2 is inserted into the opening groove 42a, the shapes of the inclined surface 41d and the inclined surface 42d are such surfaces in which the distance between the end face 21c of the first mounting protrusion 21 and the end face 22c of the second mounting protrusion 22 is decreased in the direction in which the first mounting protrusion 21 of the filter container 2 is inserted into the opening groove 41a, and the second mounting protrusion 22 of the filter container 2 is inserted into the opening groove 42a.

Similar to the opening groove 41a of the rotation element 41, the inclination of the end face 21c of the first mounting protrusion 21 of the filter container 2 is inclined toward the direction in which the first mounting protrusion 21 of the filter container 2 is inserted into the opening groove 41a. Similar to the opening groove 42a of the rotation element 42, the inclination of the end face 22c of the second mounting protrusion 22 of the filter container 2 is inclined toward the direction in which the second mounting protrusion 22 of the filter container 2 is inserted into the opening groove 42a. The end face 21c of the first mounting protrusion 21 of the filter container 2 and the inclined surface 41d of the opening groove 41a of the rotation element 41 have mutually complementary shapes. Similarly, the end face 22c of the second mounting protrusion 22 of the filter container 2 and the inclined surface 42d of the opening groove 42a of the rotation element 42 have mutually complementary shapes. Here, the complementary shapes are such surfaces that, when the filter container 2 is attached to the filter container attachment and detachment apparatus 1, i.e., in the state where the first mounting protrusion 21 of the filter container 2 is inserted into the opening groove 41a, and the second mounting protrusion 22 of the filter container 2 is inserted into the opening groove 42a, the inclinations of the end face 21c of the first mounting protrusion 21 and the end face 22c of the second mounting protrusion 22 are such that the distance between the end face 21c of the first mounting protrusion 21 and the end face 22c of the second mounting protrusion 22 is decreased in the direction in which the first mounting protrusion 21 of the filter container 2 is inserted into the opening groove 41a, and the second mounting protrusion 22 of the filter container 2 is inserted into the opening groove 42a. For example, the complementary shapes are flat surfaces or curved surfaces inclined toward the direction in which the second mounting protrusion 22 of the filter container 2 is inserted into the opening groove 42a.

Figure 2:
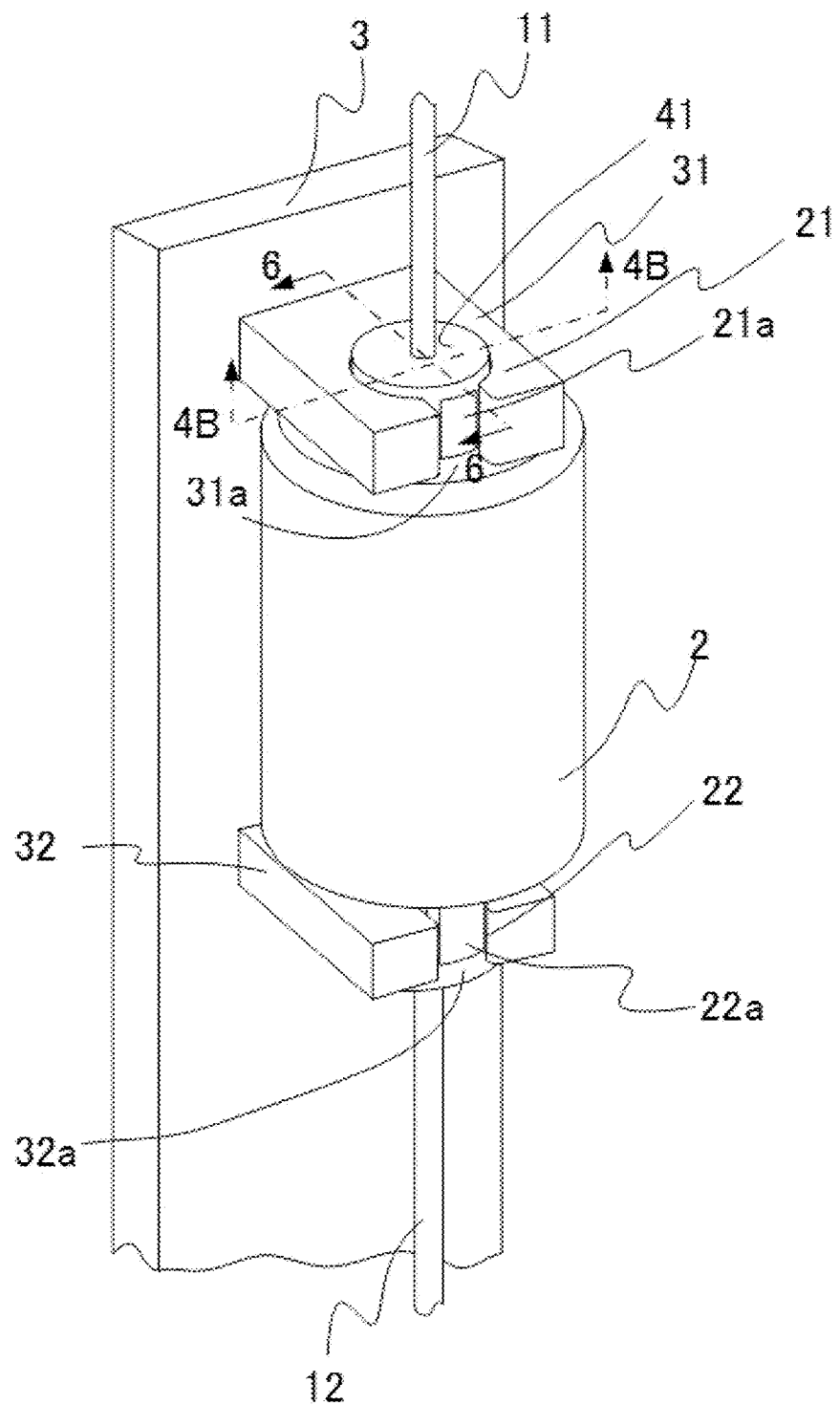
FIG. 2 shows the attachment and detachment apparatus of Embodiment 1 to which the present invention is applied, in a state after the filter container is installed to the manifold, and before the filter container is fixed to the manifold.
Figure 3:
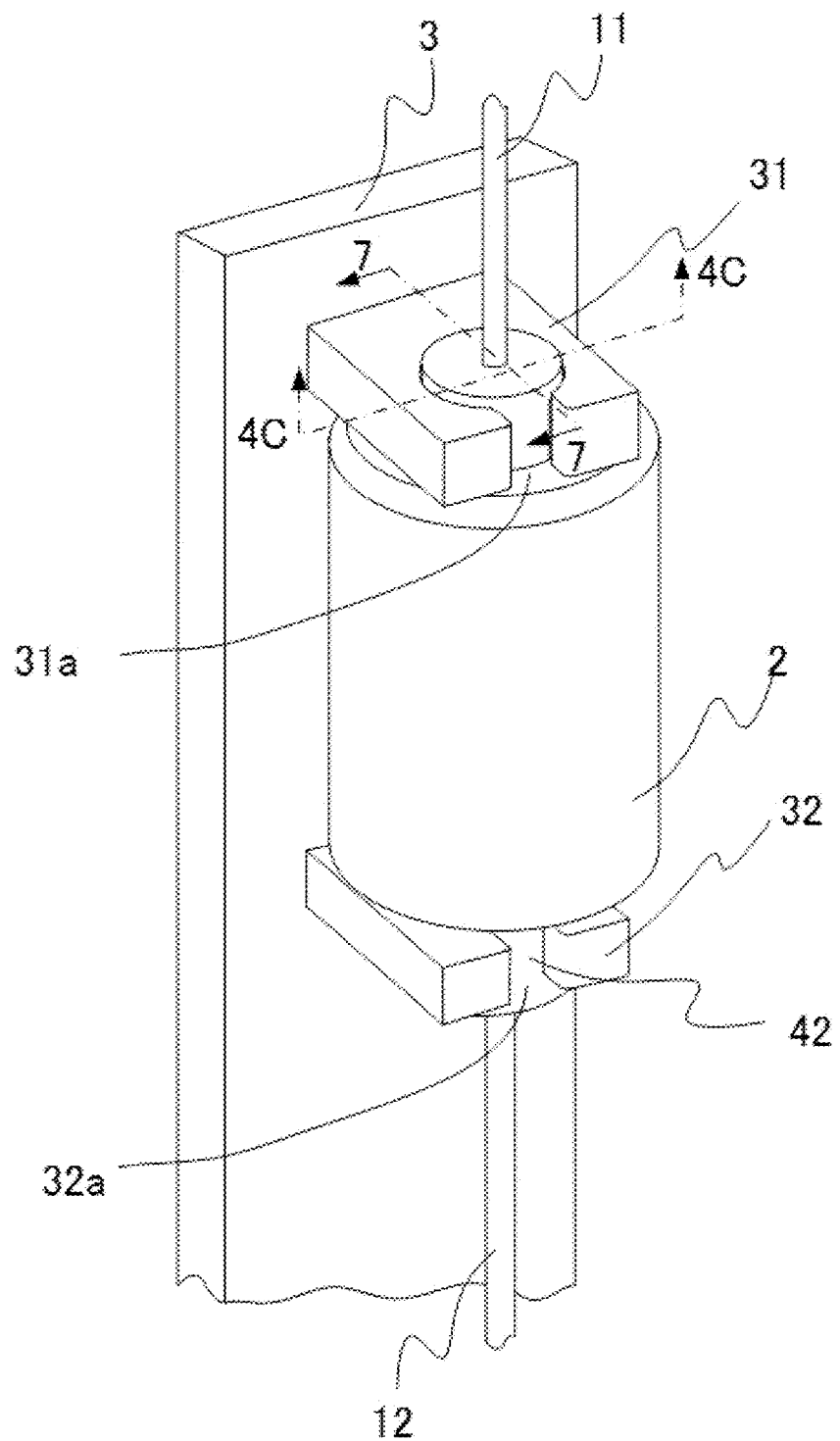
FIG. 3 shows the attachment and detachment apparatus of Embodiment 1 to which the present invention is applied, in a state after the filter container is installed to the manifold, and after the filter container is fixed to the manifold.
Figure 4A:
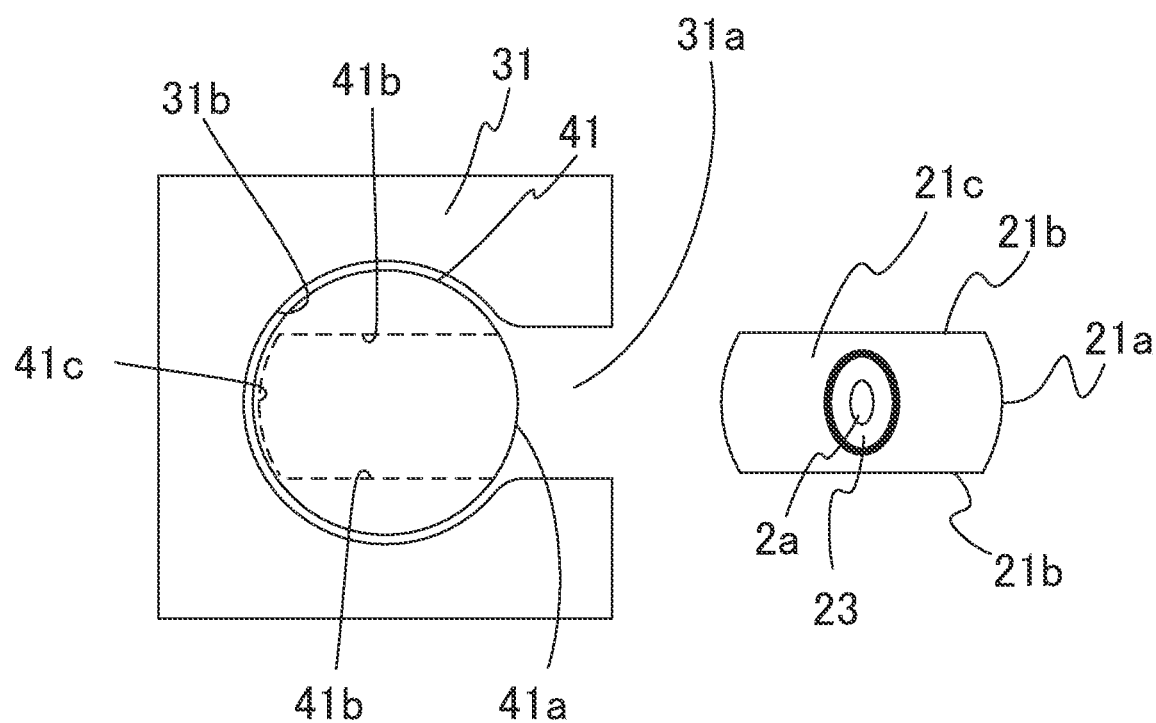
FIG. 4A is a diagram showing the cross-section 4A-4A of FIG. 1.
Figure 4B:
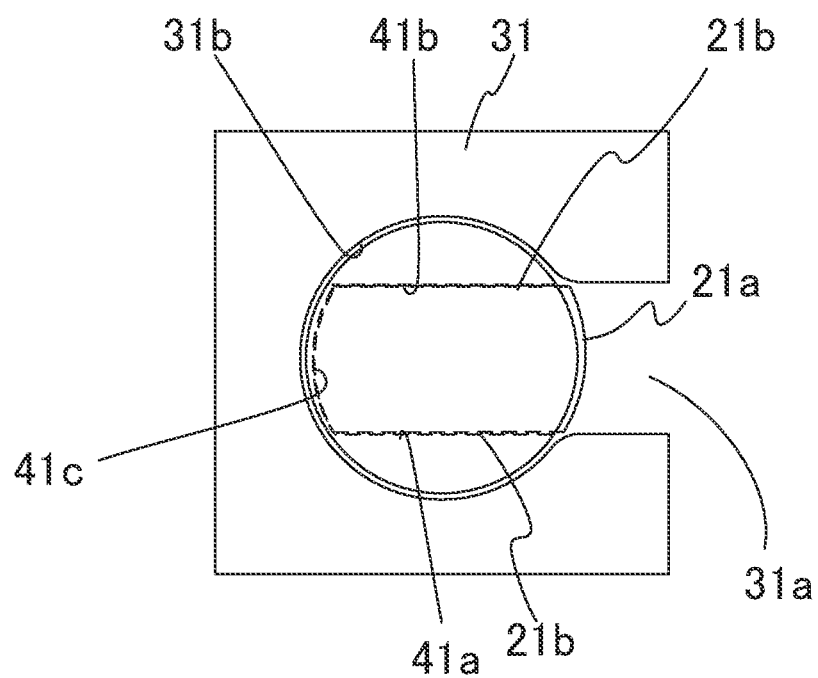
FIG. 4B is a diagram showing the cross-section 4B-4B of FIG. 2.
Figure 4C:
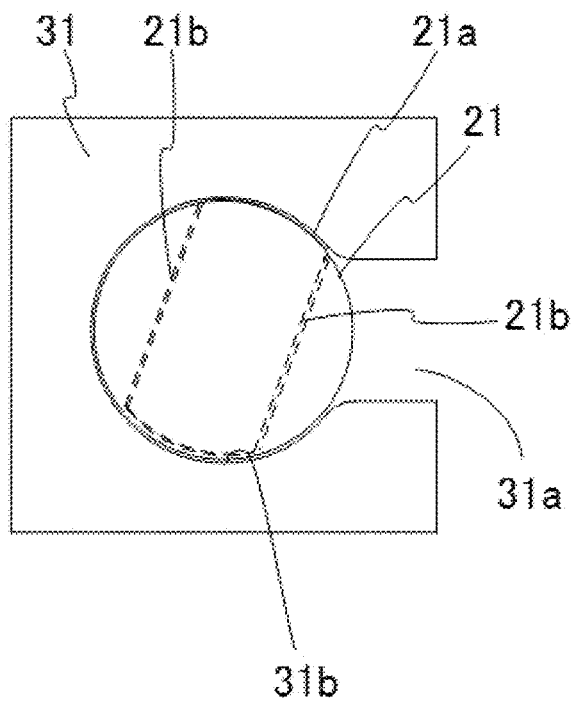
FIG. 4C is a diagram showing the cross-section 4C-4C of FIG. 3.
Figure 6:
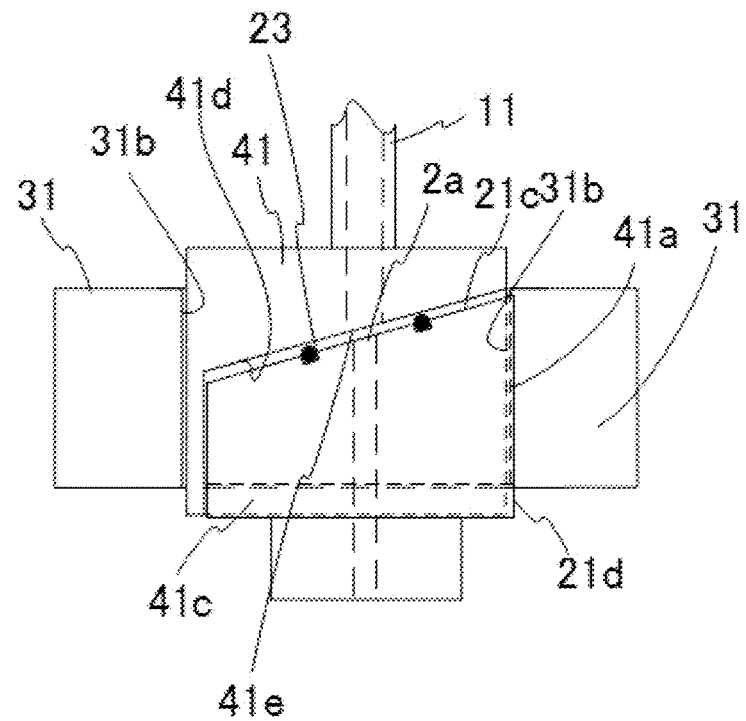
FIG. 6 is a diagram showing the cross-section 6-6 of FIG. 2.
Figure 7:
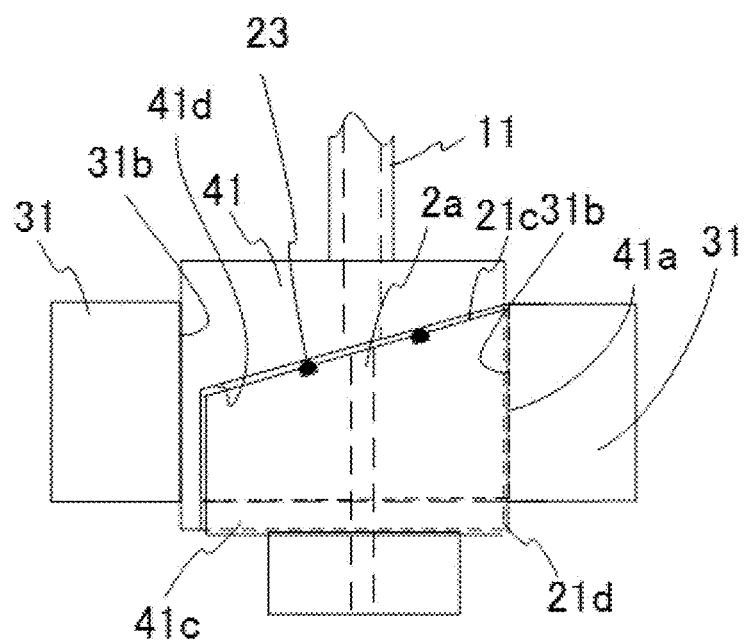
FIG. 7 is a diagram showing the cross-section 7-7 of FIG. 3.

Subsequently, with reference to FIG. 1 to FIG. 7, a description will be given of how the filter container attachment and detachment apparatus 1 functions. FIG. 2 shows a state where the filter container 2 is attached to the filter container attachment and detachment apparatus 1. FIG. 3 shows a state where the filter container 2 is fixed to the filter container attachment and detachment apparatus 1. FIG. 4A shows a diagram seen from above the first mounting protrusion holding part 31 in a state before attaching the filter container 2 to the filter container attachment and detachment apparatus 1. FIG. 4B shows a diagram seen from above the first mounting protrusion holding part 31 in a state where the filter container 2 is attached to the filter container attachment and detachment apparatus 1. FIG. 4C shows a diagram seen from above the first mounting protrusion holding part 31 in a state where the filter container 2 is attached to and fixed to the filter container attachment and detachment apparatus 1. FIG. 6 is a diagram showing a cross-section of the first mounting protrusion holding part 31 in the state where the filter container 2 is attached to the filter container attachment and detachment apparatus 1, and is a diagram corresponding to the cross-section 6-6 of FIG. 2. FIG. 7 is a diagram showing a cross-section of the first mounting protrusion holding part 31 in the state where the filter container 2 is fixed to the filter container attachment and detachment apparatus 1, and is a diagram corresponding to the cross-section 7-7 of FIG. 3.

The filter container 2 is attached to the filter container attachment and detachment apparatus 1. On this occasion, an opening entrance of the opening groove 41a of the rotation element 41 faces a notch 31a side of the first mounting protrusion holding part 31, and an opening entrance of the opening groove 42a of the rotation element 42 faces a notch 32a side of the second mounting protrusion holding part 32. The first mounting protrusion 21 and the second mounting protrusion 22 of the filter container 2 are inserted into the inside of the opening groove 41a of the rotation element 41 and the opening groove 42a of the rotation element 42 through the notch 31a of the first mounting protrusion holding part 31 and the notch 32a of the second mounting protrusion holding part 32, respectively. When seen in cross-sectional views, this is in state shifting from the state shown in FIG. 4A and FIG. 5 to the state shown in FIG. 4B and FIG. 6. On this occasion, the translation sliding surfaces 21b of the first mounting protrusion 21 of the filter container 2 are inserted into the rotation element 41 along the inner wall surfaces 41b of the opening groove 41a, and the translation sliding surfaces 22b of the second mounting protrusion 22 are inserted into the rotation element 42 along the inner wall surfaces 42b of the opening groove 42a.

The first mounting protrusion 21 and the second mounting protrusion 22 of the filter container 2 are inserted into the inside of the opening groove 41a of the rotation element 41 and the opening groove 42a of the rotation element 42, respectively. In the state where the first mounting protrusion 21 and the second mounting protrusion 22 of the filter container 2 are inserted into the inside of the opening groove 41a of the rotation element 41 and the opening groove 42a of the rotation element 42, respectively, the rotation sliding surfaces 21a of the first mounting protrusion 21 and the second mounting protrusion 22 located on an opening entrance side of the opening groove 41a and the opening groove 42a are located more outside than the inner periphery surface 31b of the first mounting protrusion holding part 31, and the inner periphery surface 32b of the second mounting protrusion holding part 32, respectively. This is because they cannot enter the inside of the opening groove 41a of the rotation element 41 and the opening groove 42a of the rotation element 42, due to the repulsion forces of the sealant 23 arranged on the end face 21c of the first mounting protrusion 21, and the sealant 23 arranged on the end face 22c of the second mounting protrusion 22.

Subsequently, the filter container 2 is rotated about the rotation center axis 2e. In this manner, the first mounting protrusion 21 and the second mounting protrusion 22 are rotated. With the rotation of the first mounting protrusion 21 and the second mounting protrusion 22, the rotation element 41 in the first mounting protrusion holding part 31 and the rotation element 42 in the second mounting protrusion holding part 32 are rotated. When seen in cross-sectional views, this is in state shifting from the state shown in FIG. 4B and FIG. 6 to the state shown in FIG. 4C and FIG. 7. At this moment, the rotation sliding surfaces 21a of the first mounting protrusion 21 and the rotation sliding surfaces 22a of the second mounting protrusion 22 located more outside than the inner periphery surface 31b of the first mounting protrusion holding part 31 and the inner periphery surface 32b of the second mounting protrusion holding part 32 are pushed to the inner periphery surface 31b of the first mounting protrusion holding part 31 and the inner periphery surface 32b of the second mounting protrusion holding part 32. In this manner, the sealant 23 arranged on the end face 21c of the first mounting protrusion 21, and the sealant arranged on the end face 22c of the second mounting protrusion 22 are pushed together to adhere to each other.

When taking into consideration that the filter container 2 is made of resin, compared with the case of metal processing, a comparatively large manufacture tolerance is generated in a distance between the end face 21c of the first mounting protrusion 21 and the end face 22c of the second mounting protrusion 22. Additionally, a size may also be changed due to environment, such as temperature. Therefore, the rotation element 41 and the rotation element 42 are configured to be able to move in a direction of the rotation center axis 2e of the filter container 2. An interval between the inner periphery surface 31b of the first mounting protrusion holding part 31 and the rotation element 41 is set to be an interval with which, when the rotation sliding surfaces 21a of the first mounting protrusion 21 are pushed by the inner periphery surface 31b of the first mounting protrusion holding part 31, the distance between the end face 21c of the first mounting protrusion 21 and the end face 22c of the second mounting protrusion 22 is within the range of a manufacture tolerance, and with which the sealant can be pushed and adhere thereto.

In this manner, the attachment and detachment of the filter container can be performed only by a translation operation and a rotating operation of the filter container, and the abrasion of the sealant can be reduced.

REFERENCE SIGNS LIST 1 filter container attachment and detachment apparatus
2 filter container
3 manifold
11 first flow path
12 second flow path
21 first mounting protrusion
22 second mounting protrusion
31 first mounting protrusion holding part
32 second mounting protrusion holding part
41 rotation element
42 rotation element

The invention claimed is:

1. A filter attachment and detachment apparatus for removably attaching a filter container containing a filter, as a part of a filtration apparatus that filters fluid with the filter, the filter container including a first mounting protrusion at one end of the filter container to protrude from the filter container, the first mounting protrusion including a flow path in fluid communication with the filter inside the filter container, the filter attachment and detachment apparatus comprising:

a rotation element to which a first flow path for the fluid is connected, the rotation element having a cylindrical-shaped surface and an opening groove on the cylindrical-shaped surface of the rotation element, the opening groove configured to receive the first mounting protrusion; and a first mounting protrusion holding part having an inner periphery surface configured to rotatably hold the cylindrical-shaped surface of the rotation element along the inner periphery surface of the first mounting protrusion holding part, the first mounting protrusion holding part including a notch communicating between an outer side of the first mounting protrusion holding part and the inner periphery surface of the first mounting protrusion holding part, wherein, in a state where the first mounting protrusion is inserted into the opening groove through the notch, by performing a rotation of the rotation element with the filter container so as to slide the cylindrical-shaped surface on the inner periphery surface, the first mounting protrusion is bound between the inner periphery surface of the first mounting protrusion holding part and the rotation element.

2. The filter attachment and detachment apparatus according to claim 1, wherein:

the filter container includes a second mounting protrusion at another end of the filter container to protrude from the filter container, the second mounting protrusion including a flow path in fluid communication with the filter inside the filter container; and the filter attachment and detachment apparatus further comprises:

another rotation element to which a second flow path for the fluid is connected, the another rotation element having another cylindrical-shaped surface and a second opening groove on the another cylindrical-shaped surface of the another rotation element, the second opening groove configured to receive the second mounting protrusion, and a second mounting protrusion holding part having an inner periphery surface configured to rotatable hold the another cylindrical-shaped surface of the another rotation element along the inner periphery surface of the second mounting protrusion holding part, the second mounting protrusion holding part including a second notch communicating between an outer side of the second mounting protrusion holding part and the inner periphery surface of the second mounting protrusion holding part, wherein, in a state where the second mounting protrusion is inserted into the second opening groove through the second notch, by the rotation axis of the rotation element, the another rotation element follows to rotate with the filter container to slide the another cylindrical-shaped surface of the another rotation element on the inner periphery surface of the second mounting protrusion holding part, the second mounting protrusion being bound between the inner periphery surface of the second mounting protrusion holding part and the another rotation element.

3. The filter attachment and detachment apparatus according to claim 2, wherein:

the cylindrical-shaped surface of the rotation element is rotatably held on the inner periphery surface of the first mounting protrusion holding part between a mate position in which the notch mates with the opening groove such that the first mounting protrusion is insertable into the opening groove and a non-mate position in which the notch does not mate with the opening groove, and the mate position enables the first mounting protrusion to be inserted into the opening groove and the non-mate position enables the first mounting protrusion to be bound between the opening groove and the inner peripheral surface of the first mounting protrusion holding part after the first mounting protrusion is inserted into the opening groove.

4. The filter attachment and detachment apparatus according to claim 3, wherein:

the another cylindrical-shaped surface of the another rotation element is rotatably held on the inner periphery surface of the second mounting protrusion holding part between a mate position in which the second notch mates with the second opening groove such that the second mounting protrusion is insertable into the second opening groove and a non-mate position in which the second notch does not mate with the second opening groove, and the mate position enables the second mounting protrusion to be inserted into the second opening groove and the non-mate position enables the second mounting protrusion to be bound between the second opening groove and the inner peripheral surface of the second mounting protrusion holding part after the second mounting protrusion is inserted into the second opening groove.

* * * * *